United States Patent [19]
Slater

[11] Patent Number: 5,295,591
[45] Date of Patent: Mar. 22, 1994

[54] STORAGE OR DISPLAY RACK

[76] Inventor: Robert C. Slater, 854 Spring Cove, Schaumburg, Ill. 60193

[21] Appl. No.: 941,211

[22] Filed: Sep. 4, 1992

[51] Int. Cl.[5] .............................................. A47F 1/04
[52] U.S. Cl. .................................. 211/59.2; 211/151; 211/187
[58] Field of Search ...................... 211/59.2, 151, 187

[56] References Cited

U.S. PATENT DOCUMENTS

| | | | |
|---|---|---|---|
| 3,269,557 | 8/1966 | Wahl | 211/151 |
| 3,900,112 | 8/1975 | Azzi et al. | 221/187 |
| 4,168,780 | 9/1979 | Parrott | 211/151 |
| 4,383,614 | 5/1983 | Miller | 211/151 |
| 5,090,547 | 2/1992 | Schafer | 211/151 |

Primary Examiner—Paula A. Bradley
Assistant Examiner—Chuck Y. Mah
Attorney, Agent, or Firm—Andrew J. Bootz

[57] ABSTRACT

There is provided an improvement in a display rack for storage batteries and the like providing gravity flow of batteries to the front of the rack for retail customer selection and pick-up. An inwardly opening generally C-shaped front beam is secured to the front of the frame defining an array of equally spaced notches and projections, and an inwardly opening generally C-shaped rear beam is secured to the rear of the frame and also defines an array of equally spaced notches and projections which are laterally aligned with the notches and projections of the front beam. Shelf assemblies extend between the front and rear beams, readily adjustable laterally to accommodate various widths of batteries. Each self assembly is formed of a U-shaped member carrying a plurality of freely rotatable rollers. The front end of the U-shaped member fits into the notches of the front beam and the web of the U-shaped member is notched at its rear to permit positioning and support of the member into the notches of the rear beam.

8 Claims, 3 Drawing Sheets

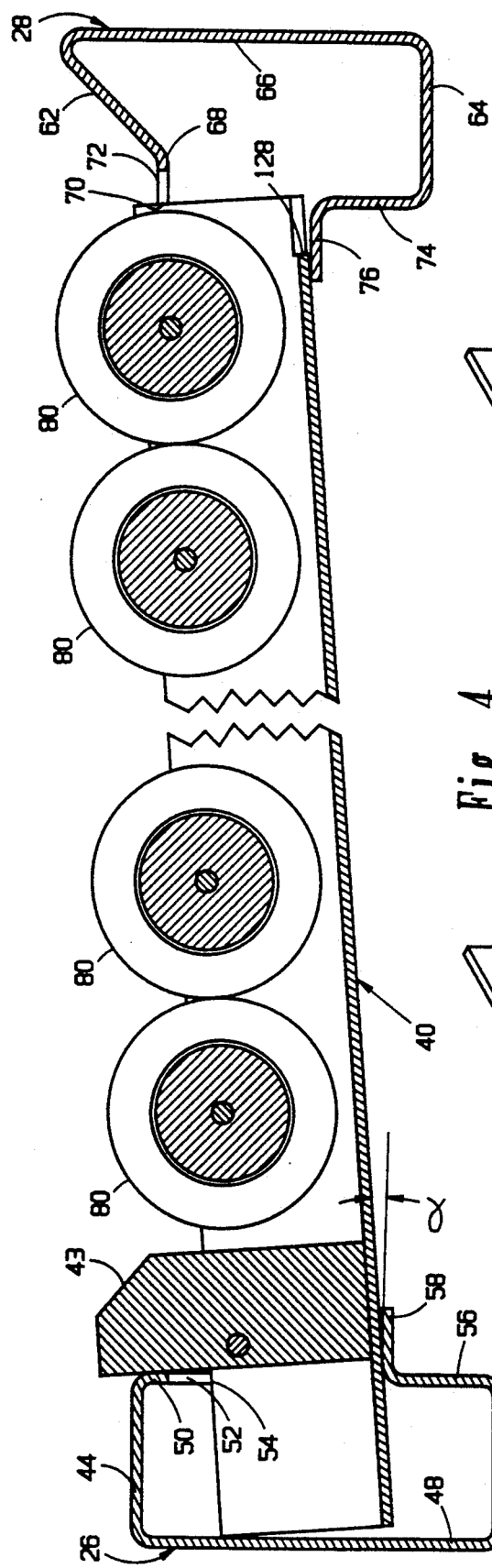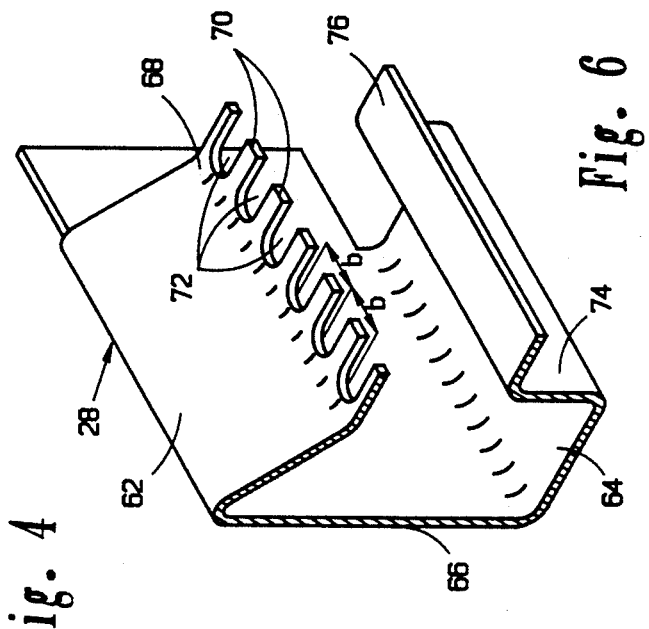
Fig. 4
Fig. 5
Fig. 6

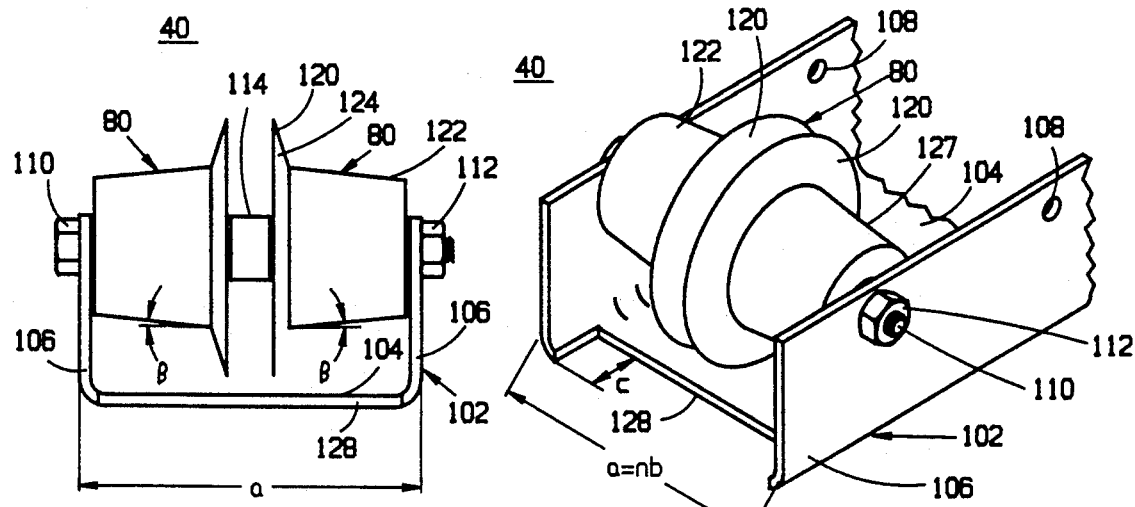
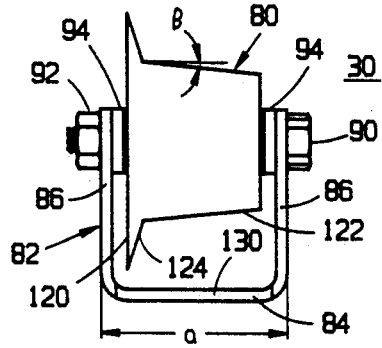
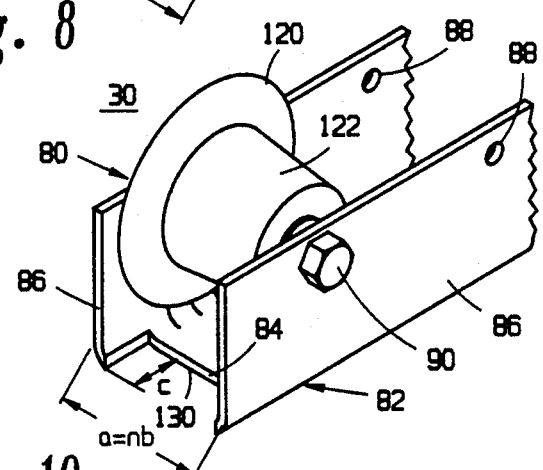
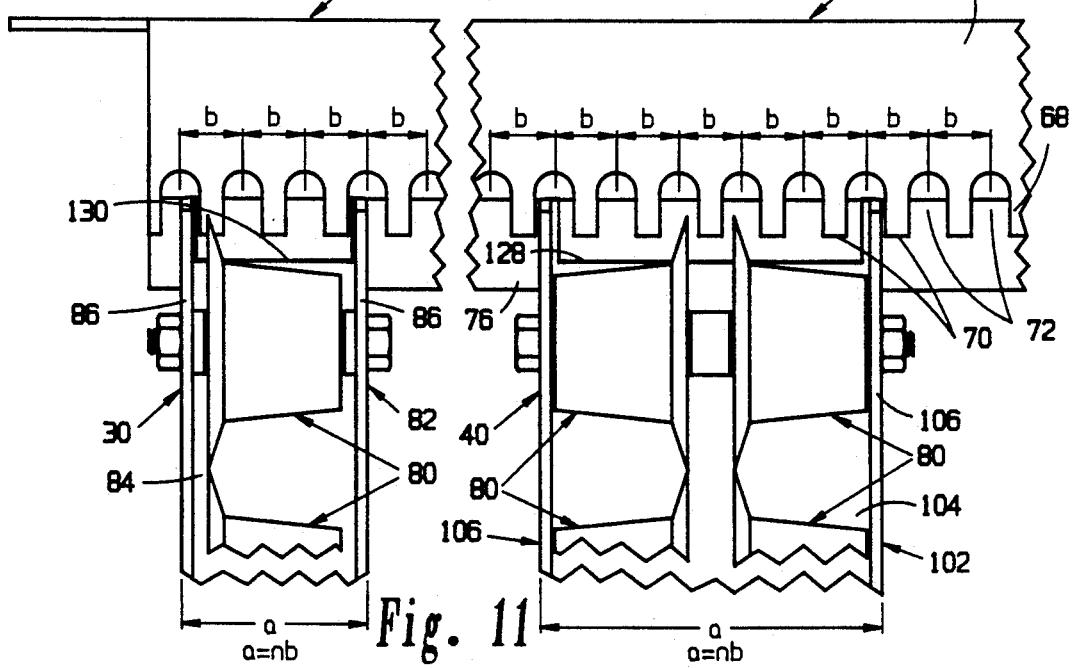

STORAGE OR DISPLAY RACK

This invention relates to improvements in a storage or display rack, and particularly to a rack of the type wherein storage batteries may be displayed in a retail sales outlet for customer selection and pick-up.

BACKGROUND OF THE INVENTION

In prior practice, automotive storage batteries have been heavy, dirty, and frequently have had acid spills which have made the batteries difficult for a retail customer to handle. Accordingly it has been the practice in retail battery outlets, such as large department and automotive stores to display only sample batteries for the customer to view and to select from; and after the customer made his selection, the sales person or service attendant would bring the desired battery from stock stored in a back room.

More recently, with the addition commercially of handles to the automotive batteries, and improvements in the size, weight and closure of the batteries against acid spills, there has been a movement by retail battery outlets to store and display their stock of storage batteries on the sales floor so that a customer can select his desired battery, and then pick the battery up, usually placing it in his shopping cart, and taking it to the "front" checkout for payment. Commonly such batteries are displayed on counters or shelves in the store. The batteries are quite heavy, and most conveniently the customer picks up the front or closest battery from the counter or shelf. It therefore becomes difficult or awkard for the next succeeding customers to reach deep onto the counter or shelf and pick up a battery.

Moreover, it is desirable for the retail outlet to rotate their inventory. If the front or accessible portion of the counter or shelf is empty, it is customary for the stock personnel to simply place new inventory on the front of the counter or shelf.

Conveyors and tracks are known where heavy articles such as storage batteries will flow by gravity to the front of the track. It is known to provide battery storage or display racks with conveyor or tracks so that the storage battery will always present itself at the front of the rack, and the customer needs only to reach to the front of the rack to select and pick up a battery. Moreover, inventory can conveniently be rotated by the stock person by placing the new stock of batteries onto the rear or back end of the rack and the batteries will flow by gravity to the front for customer selection and pick up.

It is known to provide spaced roller tracks on the rack to support the bottoms of the batteries. However, batteries come in a variety of widths, so that the track spacing must be adjusted for the particular size of battery placed on the rack. Heretofore, adjusting the track spacing and securing the track has been difficult, and has presented problems to the stock persons.

Accordingly it is an object of this invention to provide a new and improved storage or display rack for storage batteries and the like.

It is another object of this invention to provide a storage or display rack for storage batteries and the like wherein the batteries flow by gravity to the front of the rack for customer selection and pick up.

It is yet another object of the present invention to provide an improved means of adjusting the spacing between the tracks of a battery storage or display rack to accommodate various widths of batteries.

SUMMARY OF THE INVENTION

There is provided an improvement in a storage or display rack for storage batteries and the like providing for gravity flow of batteries to the front of the rack for retail customer selection and pick up.

The improved battery rack includes a frame containing a number of battery shelves. The shelves are supported between front and rear beams on the rack.

The front beam of the rack is generally C-shaped and opens rearwardly and is provided with a lower support element and an upper notched support element which defines an array of equally spaced projections. The rear beam is also generally C-shaped and opens forwardly toward the front beam. The rear beam has a lower support element and an upper notched support element which defines an array of equally spaced projections. The notches of the front and rear beams are laterally aligned with each other to receive the shelf or track assemblies.

The shelf assemblies are formed of a generally U-shaped channel carrying a plurality of freely rotatable rollers which extend upwardly to support the batteries. The shelf channel is formed of a pair of upright legs connected by a web. The front end of the channel is positioned into the open end of the front beam with the web of the channel resting on the lower support element and the upright legs of the channel positioned in the notches of the upper notched support element. The front end of the shelf assembly is thus positioned against both lateral and forward longitudinal displacement.

The rear end of the shelf channel has its web notched, and the rear end is positioned to rest on the lower support element of the rear beam with its upright legs positioned in the notches of the rear beam notched support element. The back end of the shelf assembly is thus secured against both lateral and rearward longitudinal displacement.

The front and rear beams of the rack are secured to the rack in vertically displaced relation so that the shelf assembly is provided with forward slope whereby batteries on the rack will flow by gravity to the front of the rack.

Advantageously the spacing between the shelf assemblies can be adjusted simply by lifting the shelf assembly from the beams and placing the shelf assembly with its upright legs laterally into the desired notches as is more fully hereinafter described.

Moreover the roller wheels supporting the batteries are provided with an elongated inner rim, with the rims of the wheels supporting opposite sides of a battery tapering inwardly toward each other, thereby helping the battery to center itself on the shelf assemblies and aid in the gravity flow of the battery down the rack.

BRIEF DESCRIPTION OF DRAWINGS

FIG. 4 is a fragmentary elevational view of a shelf assembly from the battery display rack of FIG. 1 illustrating the adjustability of the shelf assembly with the front beam and rear beam of the display rack, FIG. 5 is a fragmentary pictorial view of the front beam of the battery display rack according to the present invention.

FIG. 6 is a fragmentary pictorial view of the rear beam of the battery display rack according to the present invention.

FIG. 7 is a back end view of an intermediate shelf assembly according to the present invention.

FIG. 8 is a fragmentary pictorial view of the intermediate shelf assembly of FIG. 7.

FIG. 9 is a back end view of an end shelf assembly according to the present invention.

FIG. 10 if a fragmentary pictorial view of the end shelf assembly of FIG. 9.

FIG. 11 is a fragmentary plan view of the shelf assembly to rear beam and illustrating the geometry of this assembly according to the present invention.

DETAILED DESCRIPTION OF A PREFERRED EMBODIMENT

Figure 1:
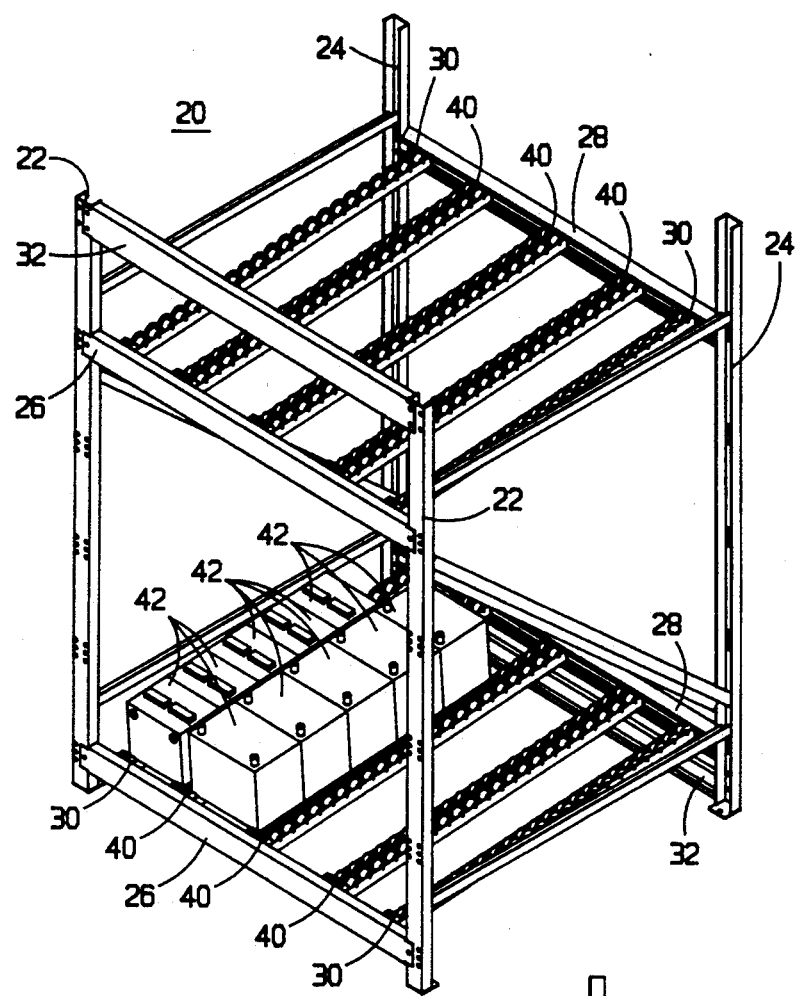
FIG. 1 is a pictorial or isometric view of a battery storage or display rack embodying the invention.
Figure 2:
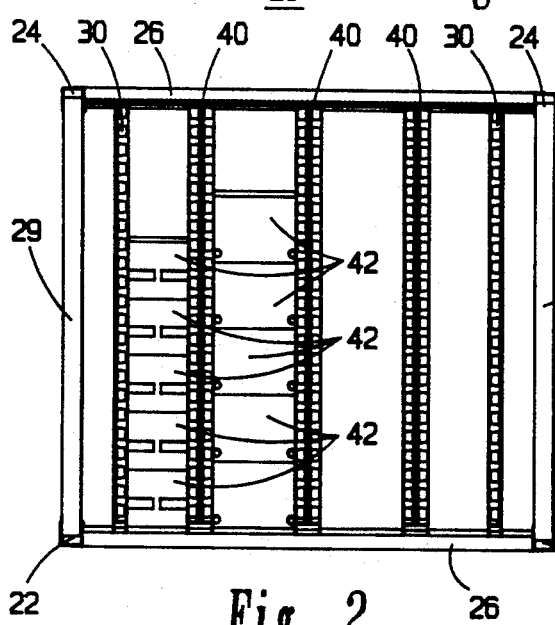
FIG. 2 is a top view of the battery display rack of FIG. 1.

Referring now to the drawings, there is illustrated an improved battery storage or display rack 20 according to the present invention. As therein illustrated, the battery display rack 20 includes front posts 22, rear posts 24, a plurality of horizontal front beams or bars 26 vertically spaced from each other, a plurality of horizontal rear beams or bars 28 vertically spaced from each other, a plurality of side beams or bars 29, and one or more diagonal sway bars 32. The posts 22, 24, the front and rear beams 26, 28, the side beams 29, and the sway bars 32 are secured to form a stable rack in any known manner, as by welding or bolting of these parts together to form the battery rack frame. The battery display rack 20 further includes a plurality of end shelf assemblies or bars 30 and a plurality of intermediate shelf assemblies or bars 40 adjustably held between the front beams 26 and the rear beams 28 according to the present invention. The battery display rack 20 is designed to hold, store, and display batteries 42, particularly automative storage batteries intended for customer pickup in retail outlets. Typically such batteries 42 have a variety of various sizes and shapes.

Figure 3:
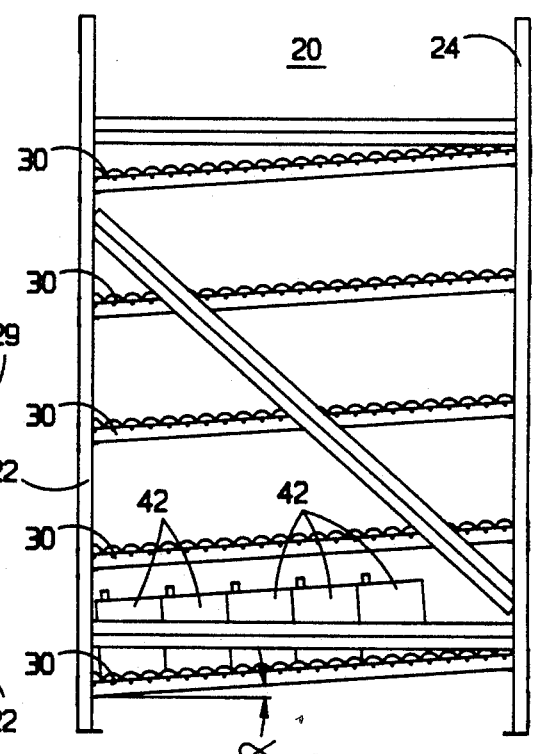
FIG. 3 is a side elevational view of the improved battery display rack of FIG. 1.

The shelf assemblies 30, 40 are supported with a slight forward decline to the horizontal, angle $\alpha$, FIGS. 3 and 4, to provide for forward flow of batteries 42 toward the front of the display rack 20 when the front battery 42 of a row of batteries is removed by a customer. The angle $\alpha$ in the illustrated embodiment is about 3°, but may be of any amount to provide for gradual flow of the batteries, and may be in the range of 3° to 5°. A bumper or stop 43, FIG. 4, limits the forward flow of the batteries after a battery has been removed from the display rack.

Referring now to the geometry of the front beam 26, best shown in FIGS. 4 and 5, the beam 26 is generally C-shaped having an upper web portion 44, a lower web portion 46 interconnected by a vertical bight or web portion 48. The upper web portion 44 terminates in a downwardly projecting support leg 50 defines by an array of downwardly extending, equally spaced projections 52 forming a plurality of equally spaced notches 54. The spacing between the notches 54, FIGS. 4 and 11, is indicated by dimension b. The lower web portion 46 has an inner upwardly extending leg portion 56, FIG. 5, terminating in an outwardly projecting, lower horizontal support or leg element 58. As best seen in FIG. 4, the outwardly projecting lower support leg 58 extends outwardly further than the downwardly projecting support leg 50.

The rear beam 29, best shown in FIGS. 4, 6 and 11, is also generally C-shaped having an upper web portion 62, a lower web portion 64, and a vertical bight or web portion 66 interconnecting the web portions 62 and 64. The upper web portion 62 terminates in a downwardly and forwardly projecting support leg 68 having an array of outwardly extending projections 70 defining an array of outwardly extending, equally spaced notches 72. The spacing between the notches 72, FIGS. 6 and 11, is indicated by the dimension b. The lower web portion terminates in an upwardly extending leg portion 74, terminating in an outwardly extending, lower horizontal support leg or element 76. As best seen in FIGS. 4 and 11, the lower support leg 76 extends outwardly further than the outwardly extending projections 70 formed in the support leg 68.

The end shelf assembly 30, FIGS. 9 and 10, and the intermediate shelf assemblies 40, FIGS. 7 and 8, are similar, but the end shelf assembly 30 has a single row of roller wheels 80 while the intermediate shelf assemblies 40 have two rows of opposing roller wheels 80. The end shelf assembly 30 includes a generally U-shaped member 82 having a bight or web portion 84 and a pair of vertical, upwardly extending leg portions 86. The leg portions 86 are provided with a series of equally spaced apertures 88 so that the row of roller wheels 80 may be bolted to the U-shaped member 82 by a bolt 90 extending through aligned apertures and a nut 92. End spacers 94 may be used to center or space the roller wheels 80 on the U-shaped member 82.

Similarly each intermediate shelf assembly 40 includes a generally U-shaped member 102 having a bight or web portion 104 and a pair of vertical, upwardly extending leg portions 106. The leg portions 106 are provided with a series of equally spaced apertures 108 so that the double row of roller wheels 80 may be bolted to the U-shaped member 102 by a bolt 110 extending through aligned apertures and a nut 112. A center spacer or divider 114 is optionally inserted to space the opposing roller wheels 80 apart and to allow for independent rotation of each pair of opposing wheels. Other spacers or washers may also be used to allow free rotation of the roller wheels as is well known in the art.

The roller wheels 80, best shown in FIGS. 7 through 11 on both the end shelves 30 and the intermediate shelves 40 are freely rotatable on their respective mounting bolts. The roller wheels 80 may be formed of any suitable corrosion resistant material, and each includes a flange 120 along one end of an elongated rim 122. The flange 120 extends radially outwardly of the rim 122, and may have an inclined surface 124 confronting toward the rim 122. The outer radial surface of the rim 122 is tapered or declined axially outwardly away from the flange 120 at an angle $\beta$, FIGS. 7 and 8. The angle $\beta$ may be of any suitable inclination and aids to center the batteries 42 flowing down the rack 20, and in the illustrated embodiment, the angle $\beta$ is 3° to 5°. It is apparent that the rear beams 28 are mounted on the battery display 20 vertically displaced from its associated front beam 26 to provide the desired angle $\beta$ to the shelf assemblies 30, 40 supported thereon.

The front end of each shelf assembly 30, 40 is positioned on the front beam 26, with their respective leg portions 86, 106 positioned within one of the notches 54 of the front beam, and their respective bight portions 84, 104 resting on the support element 58 of the front beam 26. The front of the shelf assembly 30, 40 may be readily slipped into the desired notches 54, where it is supported and secured against both lateral and forward longitudinal displacement. It is therefore necessary that the width of the shelf assembly 30, 40, dimension a, FIGS. 7 through 10, must be n times the spacing b of the notches 54, that is, a equals n×b.

The rear end of each shelf assembly 30, 40 is positioned on the rear beam 28. To accommodate the support of the shelf assemblies 30, 40, each of the shelf assemblies 30, 40 is notched to position the respective shelf 30, 40. Specifically, and referring to FIGS. 7, 8 and 11, each intermediate shelf assembly 40 has its bight portion 104 notched at its back end, 128, a depth c sufficient to clear the projections 70 on the rear beam. The end shelf assemblies likewise has its bight portion 84, FIGS. 9, 10 and 11, notched at its back end, 130, a depth c sufficient to clear the projections 70 on the rear beam. The rear end of each shelf assembly 30, 40 is thus positioned in the notches 72 of the rear beam 28, with the vertical web portions 48, 66 thereof spaced between the projections 70 and the back of the bight portions 84, 104 resting on the support element 76 of the rear beam 28. The shelf assembly 30, 40 is thus secured against both lateral and rearward longitudinal displacement.

Advantageously each shelf assembly 30, 40 may be readily adjusted transversely across the battery display rack to accommodate various widths of batteries without the use of bolts or other fasteners. The shelf assembly 30, 40 is simply inserted into the desired location by placing the front of the shelf assembly 30, 40 into the desired notches 54 of the front beam 26, with the upright leg portions 86, 106 thereof positioned by the downward projections 50, and the bight portions 84, 104 resting on the support element 58. The front of the shelf assemblies 30, 40 butts against the inner surface of the vertical web portion 48 of the front beam 26. The inclination α of the shelf assemblies 30, 40 tends to position and maintain the shelf assembly 30, 40 butted against this inner surface of the upright web portion 48, FIG. 4.

After the front end of the shelf assembly 30, 40 has been inserted into the front beam 26, the rear end of the shelf assembly can be simply dropped into place on the rear beam 28, best shown in FIG. 4. The upright leg portions 86, 106 of the shelf assembly 30, 40 can drop into the notches 72 of the rear beam 28, between the outward projections 70 thereof. The notch 128, 130 provides for clearance between the bight portions 84, 104 of the shelf assemblies 30, 40 and the ends of the projections 70, best shown in FIGS. 4 and 11. The end notches 128, 130 must be deep enough to provide for this installation clearance, but preferrably, as shown, is shallow enough so that the bight portions 84, 104 will rest on the support element 76. Once into place, the shelf assembly 30, 40 is restrained from rearward movement due to the interference between the rear ends of the leg portions 86, 106 with the bottom of the notches 72, and the rear of the shelf assemblies 30, 40 is restrained against transverse or lateral movement by the projections 70.

It will be obvious to those skilled in the art that various modifications and embodiments may be made that fall within the scope of the present invention, and the invention is defined by the claims annexed to and forming a part of this specification.

What is claimed as new and desired to be secured by Letters Patent of the United States is:

1. The improvement in a display rack for storage batteries and the like of the type having a frame and a plurality of battery shelves, said improvement comprising:
   a front beam secured to said frame, said front beam being generally C-shaped and opening rearwardly and having a lower support element and an upper notched support element, said upper and lower support elements being connected by web portions, said notches defining an array of equally spaced downwardly extending projections;
   a rear beam secured to said frame, said rear beam being generally C-shaped opening forwardly toward said front beam and having a lower support element and an upper notched support element, said upper and lower support elements being connected by web portions, said notches defining an array of equally spaced projections laterally aligned with the notches and projections of the front beam;
   a plurality of shelf assemblies supported between said beams, each of said shelf assemblies having a generally U-shaped shelf channel defined by a pair of upright legs connected at their lower edge by a web;
   The front end of each shelf channel being positioned into the open end of said front beam with the web of the shelf channel resting on the lower support element of the front beam and the upright legs positioned in the notches of its upper notched support element whereby the front end of said support assembly is positioned against lateral and forward longitudingal displacement;
   the rear end of each shelf channel having its web notched and positioned to rest on the lower support element of the rear beam with its upright legs positioned in the notches of the rear beam notched support element whereby the shelf assembly is secured against lateral and rearward longitudintal displacement; and
   a plurality of rollers mounted between the upright legs of said shelf channel and extending upwardly above the upper ends of the upright legs.

2. The improvement in a display rack as set forth in claim 1 above wherein the forward end of each shelf channel abutts against the front beam to position the shelf assembly against forward longitudinal movement.

3. The improvement in a display rack as set forth in claim 1 above whereby the notched support element of the rear beam includes forwardly extending projections and the notch on the web of the shelf channel clears the forwardly extending projections on the notched support element.

4. The improvement in a display rack as set forth in claim 3 above wherein the lower support element of the rear beam extends more forwardly than the notched support element thereof with the notched web of the shelf channel resting on said lower support element.

5. The improvement in a display rack as set forth in claim 1 above whereby the front beam and rear beam are secured to the frame vertically displaced relative to each other to provide a forward downward slope to the shelf assembly whereby storage batteries placed on the rack will gravity flow to the front of the display rack.

6. The improvement in a display rack as set forth in claim 1 above whereby the rollers mounted on the shelf channel have an outer flange and an inner axially elongated rim for supporting the batteries, said rim being tapered inwardly away from the outer flange whereby batteries gravity flowing toward the front of the rack will have a tendancy to center themselves between the shelf assemblies.

7. The improvement in a display rack as set forth in claim 1 above whereby the spacing of the upright legs of the shelf channel is n times the spacing between the notches of the front and rear beams, where n is a whole number.

8. The improvement in a display rack for storage batteries and the like of the type having a frame and a plurality of battery shelves, said improvement comprising:

a front beam secured to said frame, said front beam being generally C-shaped and opening rearwardly and having a lower support element and an upper notched support element, said notches defining an array of equally spaced, downwardly extending projections;

a rear beam secured to said frame, said rear beam being generally C-shaped and opening rearwardly and having a lower support element and an upper notched support element defining an array of equally spaced forwardly extending projections laterally aligned with the notches and projections of the front beam, the lower support element extending more forwardly than the upper notched support element;

A plurality of shelf assemblies, each having a generally U-shaped shelf channel having a pair of upright legs connected at their lower edge by a web, said web being notched at its rear;

the front end of each of the shelf assemblies being removably positioned into the open end of the front beam with the end of the shelf channel resting on the lower support element of the front beam and the upright legs thereof positioned in the notches of its upper notched support element and abutting against the front beam to position the front end of the shelf assembly laterally and against forward longitudinal displacement;

the rear end of each of said shelf assemblies having its web notched to clear the forwardly extending projections on the rear beam, and positioned with its upright legs resting on the lower support element of the rear beam and the upright legs positioned in the notches of the rear beam notched support element whereby the rear of the shelf assembly is positioned laterally and against longitudinal rearward displacement; and a plurality of rollers mounted between the upright legs of said shelf channel and extending upwardly above the upper ends of the upright legs;

the front beam and rear beam being secured to the frame vertically displaced to provide a forward slope to the shelf assembly whereby storage batteries displaced on the rack will flow by gravity to the front of the rack;

the spacing of the upright legs of the shelf assembly being n times the spacing between the notches of the front and rear beams, where n is a whole number, whereby the shelf assemblies are selectively positioned laterally into notches to provide for various spacing thereof to accommodate different battery widths.

* * * * *